July 5, 1949.  A. W. CROKER ET AL  2,475,015
SAFETY ASTRAGAL

Filed Jan. 2, 1945  6 Sheets-Sheet 1

ARTHUR W. CROKER and
PAUL R. DOEG,
INVENTORS.

BY Donald E. Windle,
ATTORNEY.

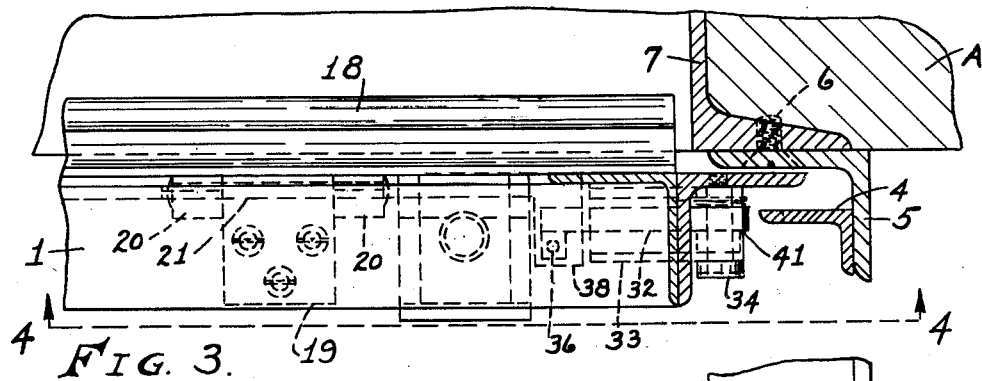
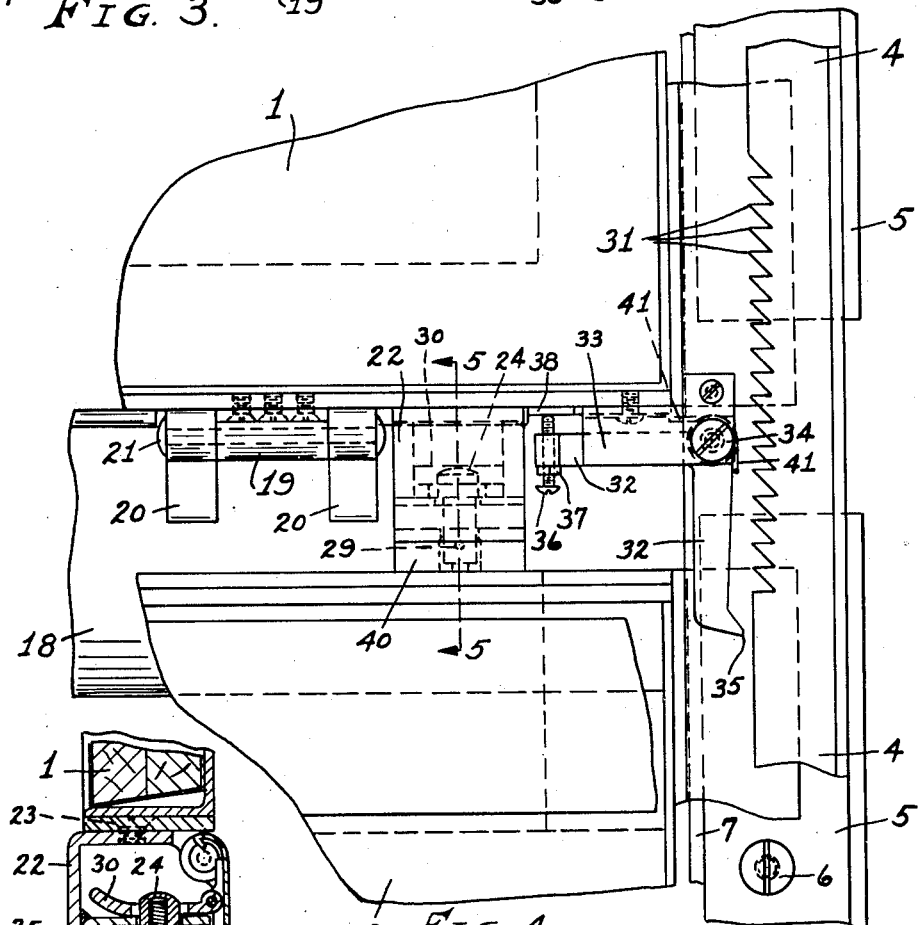
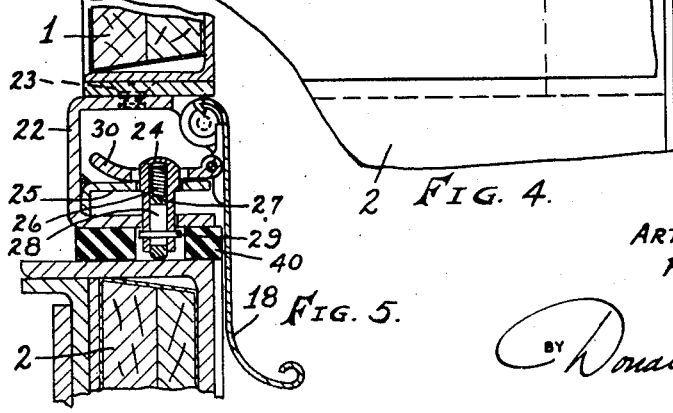

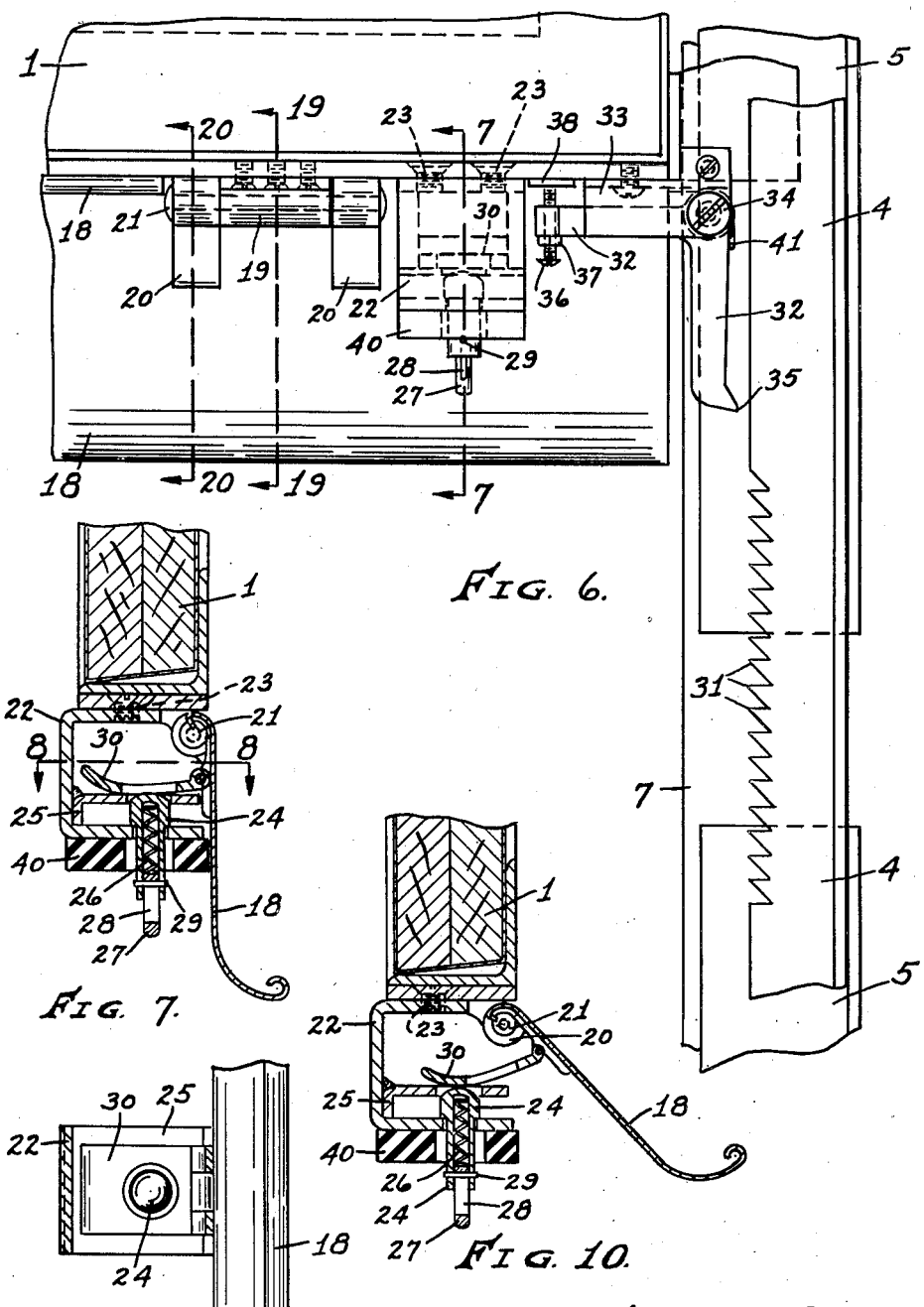

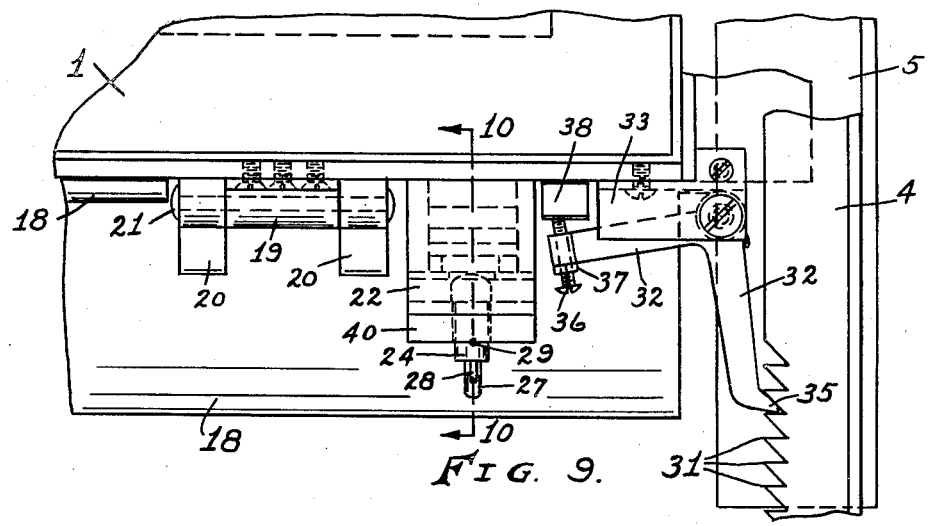
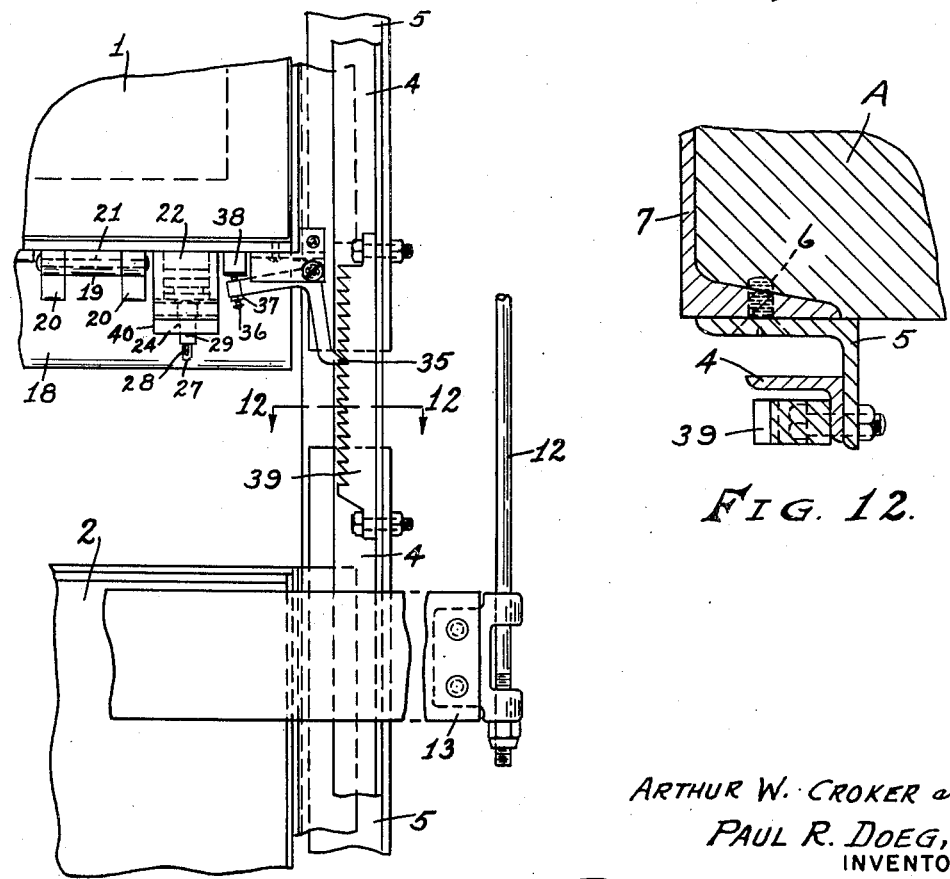

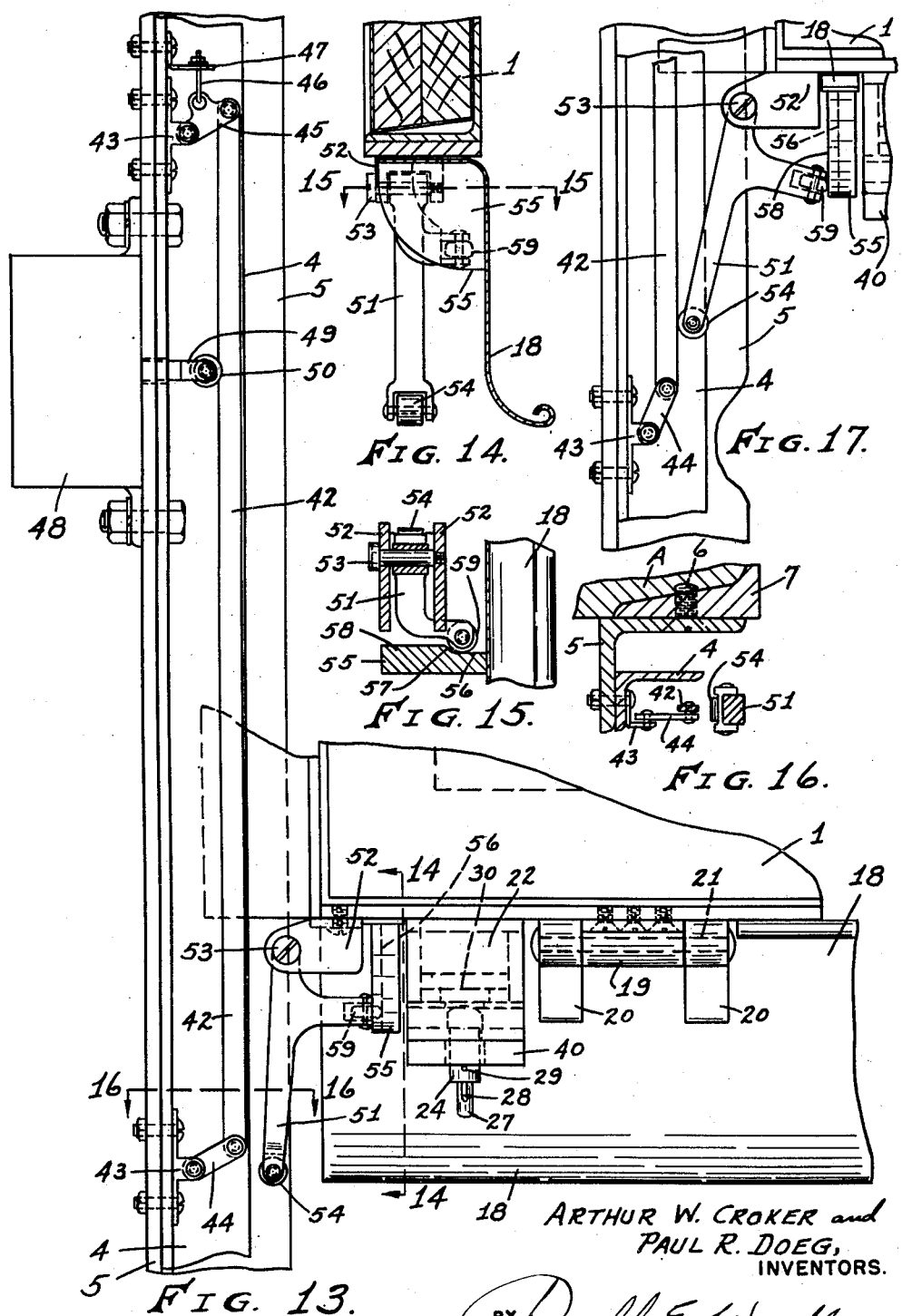

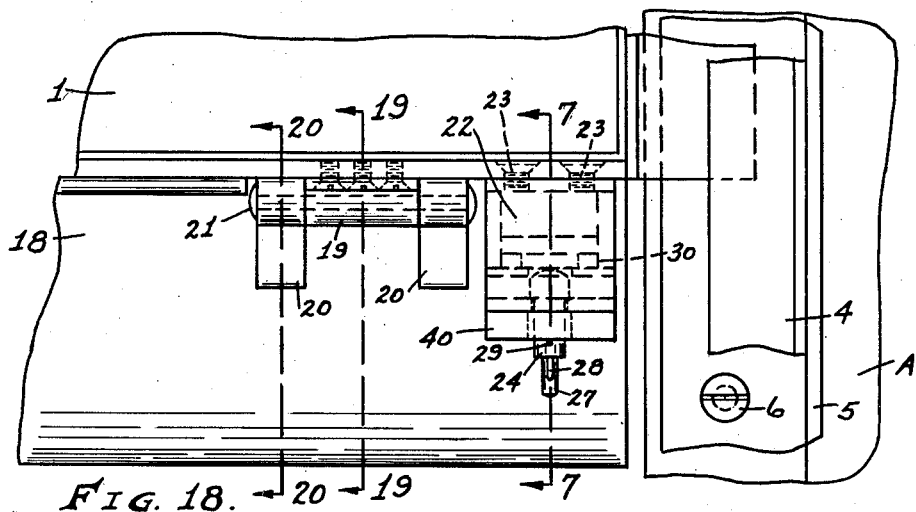
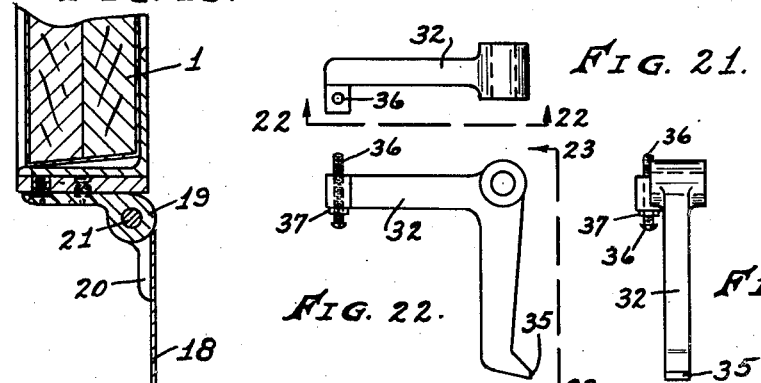
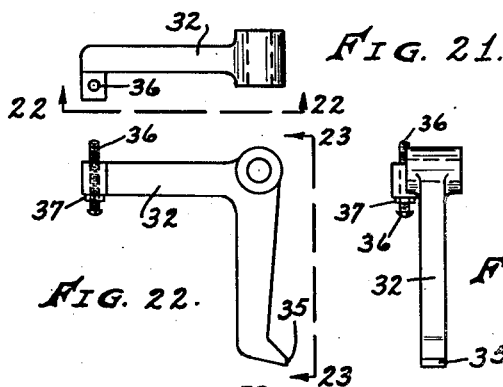
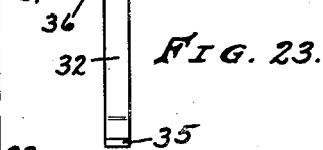
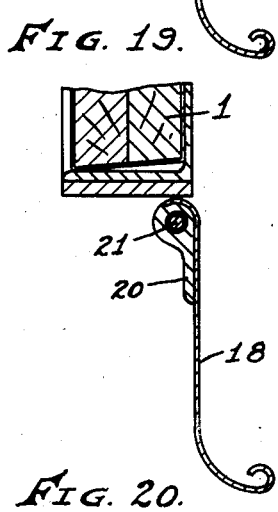
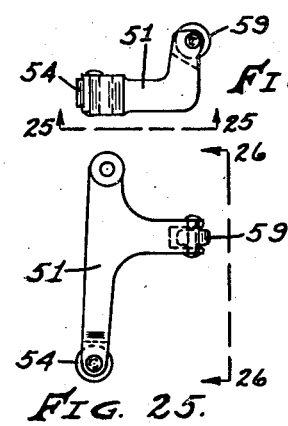
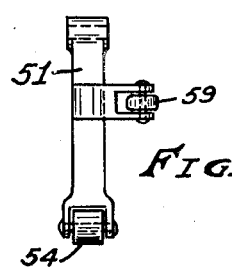
ARTHUR W. CROKER and
PAUL R. DOEG,
INVENTORS.
BY Donald E. Windle
ATTORNEY.

UNITED STATES PATENT OFFICE 2,475,015

SAFETY ASTRAGAL

Arthur W. Croker, Valley Stream, and Paul R. Doeg, Jamaica, N. Y., assignors to The Peelle Company, Brooklyn, N. Y.

Application January 2, 1945, Serial No. 571,076

4 Claims. (Cl. 20—19)

The astragal described herein and shown in the accompanying drawings is primarily intended to be used in connection with counterbalanced freight elevator doors in which the sections thereof move vertically away from each other in opening, and move vertically toward each other in closing. The astragal is provided for the purpose of covering the joint between the sections of the door when the door is in fully closed condition, thereby providing an obstruction to fire hazards when the door is closed.

Ordinarily, a depending steel member is rigidly secured to the lower edge of the upper door section for the above-mentioned purpose. In the manual operation of a counterbalanced door, it is necessary for the operator to close the door by moving the upper section thereof downwardly by exerting a pull on some portion thereof. As the upper section moves downwardly, the companion lower section is moved upwardly by reason of the upper and lower sections being connected by means of chains having one end thereof secured to the upper section and extending over sheaves with the other end being secured to the upper ends of chain rods which are secured to and carried by the lower section of the door. The astragal member, being secured to the lower edge of the upper section, passes the upper edge of the lower section with a minimum of clearance being provided between the astragal and the adjacent face of the lower door section as the sections assume a closed position. Usually, a strap closing member is attached to the upper section of the door with the strap providing a means by which the operator may exert the necessary pull to close the door. At times, when closing the door, the operator may be on the opposite side of the door from the strap closer and must necessarily reach under the upper section of the door to exert the necessary pull on the strap to close the door. As the sections approach each other in coming to a closed position, the operator may still be holding to the strap closer, with the result that his hand or arm may be caught between the astragal on the upper section and the upper edge of the lower section. If a rigidly secured astragal is attached to the upper section, the operator is in danger of becoming seriously injured by reason of the shearing effect of the astragal passing the upper edge of the lower section as the door assumes fully closed position.

In order to overcome the hazard of injury to the operator, we have provided an astragal which is hingedly secured to the upper section of the door and which effectively closes the space between the sections when the door is fully closed.

In order to overcome the eventualities of operators becoming injured, we have provided a hinged astragal in the most simple form and which is adapted to be used in connection with a manually operated door without any connection between the astragal and the guide rails of the door, and which provides the necessary safety features. In the use of this particular hinged astragal, it is necessary to provide sufficient space between the upper and lower sections of the door when in fully closed condition that there will be no crushing or bruising effect to the operator's hand or arm should the same be caught by the door in its closing movement.

We have also provided a further advanced hinged astragal for use with manually operated doors wherein we have provided means in connection therewith engaging ratchets attached to or formed in the guide rails of the door with the ratchets providing means arresting the closing movement of the door sections when the astragal is swung out of its normal position by contact with an obstruction.

In order to adapt the astragal to power operated doors, we have provided means operable through connections with the hinging action of the astragal, with said means operating an electrical interlocking switch which will instantly break the electrical circuit to the motor should the astragal be hinged from its normal position. When desired, a motor reversing switch may be substituted for the interlocking switch and which provides means reversing the closing movement of the door should the astragal be hinged out of its normal position by contact with an obstruction during the closing movement of the door.

In order to prevent hinging movement of the astragal from its normal position when the door is in its fully closed condition, we have further provided locking pins in connection therewith, thereby preventing the passage of flames between the sections of the door, and which is in conformity with rules governing the use of doors in elevator hatchways.

An object of the invention is the provision of an astragal member hinged to and carried by a door which reduces the possibility of injury to the operator of the door as the door assumes its closed position.

A second object of the invention is the provision of an astragal member which is hingedly secured to the lower edge of the upper section of the door, and is swingable out of its normal alignment should it strike an obstruction.

A third object is the provision of a ratchet secured to or formed in adjacent guide rails and a pawl pivotally secured to the upper section of the door and adapted to be moved into engagement with the ratchet by the swinging action of the astragal.

A fourth object is the provision of a ratchet secured to or formed in adjacent guide rails, with the ratchet being engageable by a pawl pivotally secured to the upper section of the door, and with the astragal member being hingedly secured to the upper section of the door, and with the swinging movement of the astragal causing the pawl to engage the ratchet and immediately arrest the closing motion of the door.

A further object is the provision of an astragal hingedly secured to the upper section of a counterbalanced elevator door with the astragal being provided with locking pins preventing hinging action of the astragal from its normal position when the door is in fully closed condition.

A still further object is the provision of an astragal hingedly secured to the upper section of a motor operated counterbalanced elevator door, and with means operable by the swinging action of the astragal breaking the electrical circuit to the motor.

Another object is the provision of a hinged astragal secured to the upper section of a motor operated counterbalanced elevator door, and with means operable by the hinging action of the astragal reversing the closing motion of the door.

Other objects and advantages of the invention will become more apparent in the course of the following description, and that which is new will be pointed out in the appended claims.

The preferred and most satisfactory means of carrying out the application of the invention in a practical manner is shown in the accompanying six sheets of drawings, in which:

Figure 3 is a horizontal detail section taken on line 3—3 of Figure 1 and showing the guide rails of the door, but with some of the door appurtenances being omitted for clarity of detail.

Figure 4 is a partial detail elevation taken at or near the center of the opening and showing the relation of the upper and lower sections of the door in closed condition, and as taken from line 4—4 of Figure 3.

Figure 5 is a detail vertical section taken on line 5—5 of Figure 4 through the lower portion of the upper section and the upper portion of the lower section, and showing the hinged astragal and the locking pin.

Figure 6 is a partial shaft side elevation of the lower portion of the upper door section and showing the astragal locking pin in disengaged condition.

Figure 7 is a detail vertical section taken on line 7—7 of Figure 6.

Figure 8 is a horizontal detail section through the astragal and the locking pin housing, as taken on line 8—8 of Figure 7.

Figure 9 is a partial shaft side elevation similar to Figure 6 except the astragal is shown as being swung from its normal position, and with the pawl engaging the ratchet teeth formed in the adjacent edge of the guide rail.

Figure 10 is a detail vertical section taken on line 10—10 of Figure 9, and showing the position assumed by the hinged keeper when the astragal is swung from its normal position.

Figure 11 is a detail elevation similar to Figure 9 except that a separate ratchet member is shown instead of the ratchet teeth being formed in the edge of the guide rail, and with the separate ratchet member being provided in connection with door assemblies previously installed.

Figure 12 is a detail horizontal section through the guide rail and the separate ratchet member, as taken on line 12—12 of Figure 11.

Figures 1, 2:
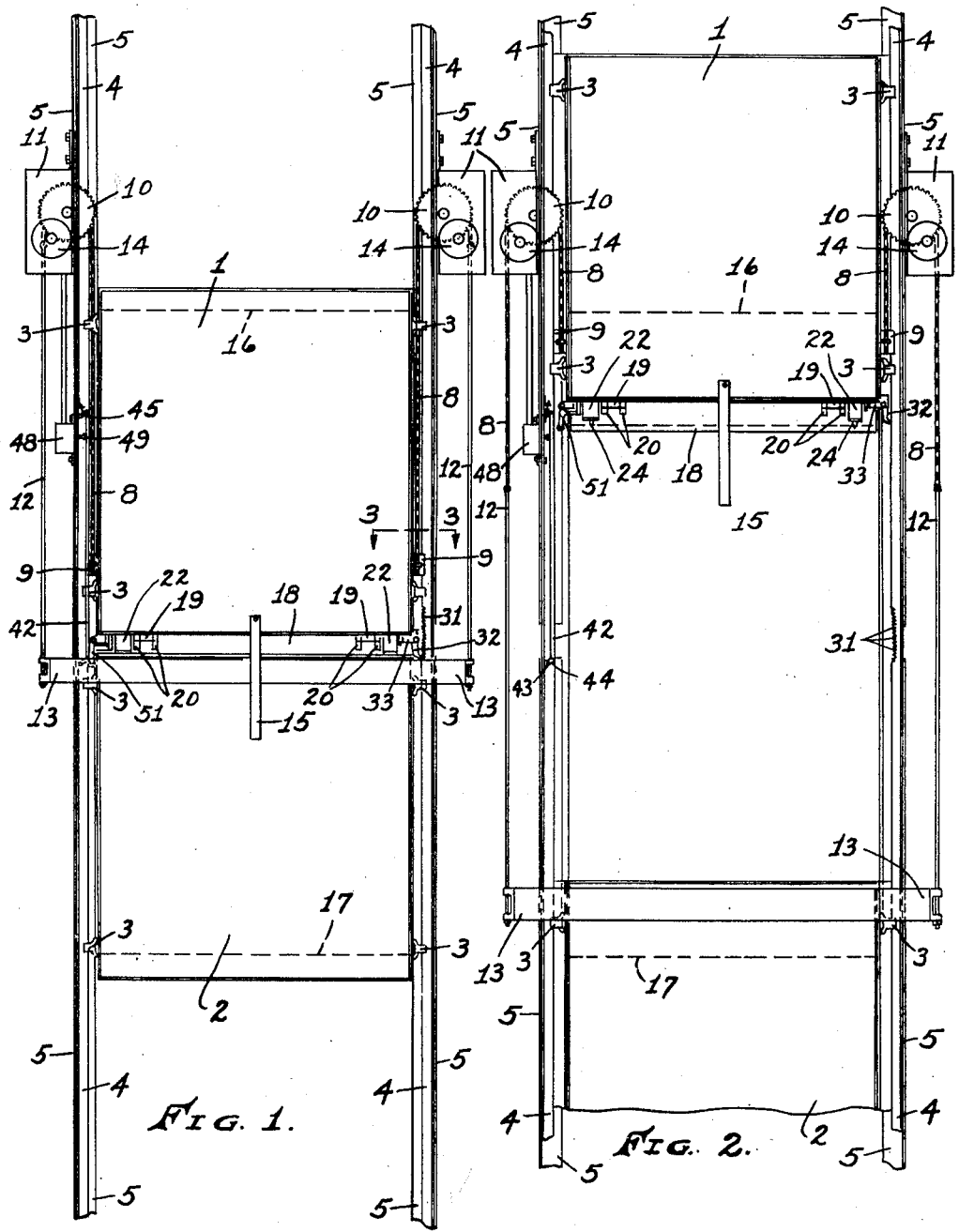
Figure 1 is a shaft side elevational detail of a counterbalanced elevator door embodying the invention and with motor operating means being provided in connection therewith, and with the door being shown in closed condition.
Figure 2 is an elevational detail of the door similar to that shown in Figure 1 except that the door is shown in partially open condition.

Figure 13 is a partial shaft side elevation taken at the opposite edge of the door from the above-described Figures 3 through 12, and showing an interlocking device operable through a cam mechanism by means of a cam operating arm, with the arm being actuated by the swinging of the astragal out of its normal position, and with the cam operating arm being shown in non-contacting relation with the cam.

Figure 14 is a detail vertical section, taken on line 14—14 of Figure 13.

Figure 15 is a horizontal detail section taken on line 15—15 of Figure 14 and showing the cam which is secured to the astragal and which actuates the cam operating arm when the astragal is swung from its normal position.

Figure 16 is a detail horizontal section taken on line 16—16 of Figure 13.

Figure 17 is a partial shaft side elevation similar to Figure 13 except with the cam operating arm engaging the cam member.

Figure 18 is a partial shaft side elevation of one end of the lower portion of the upper door section and showing a hinged astragal in connection therewith, but without the pawl and ratchet.

Figures 19 and 20 are detail vertical sections through the astragal and hinge members as taken on lines 19—19 and 20—20 respectively of Figures 6 and 18.

Figure 21 is a detail plan view of the pawl member.

Figure 22 is a shaft side elevational detail of the pawl member, taken from line 22—22 of Figure 21.

Figure 23 is a detail end view of the pawl member, taken from line 23—23 of Figure 22.

Figure 24 is a top plan view of the cam operating arm.

Figure 25 is a shaft side elevation of the cam operating arm, taken from line 25—25 of Figure 24.

Figure 26 is a detail side view of the cam operating arm, taken from line 26—26 of Figure 25.

Like characters designate like parts throughout the several views.

In order that the construction and the operation of the invention may be more fully understood, we will now take up a detailed description thereof, in which the same will be more comprehensively set forth.

Referring now to the drawings in detail, 1 designates the upper section of the door and 2 designates the lower section. Each of the sections is adapted to move vertically between guide rails 4, with guide shoes 3 providing means guiding the door sections in their vertical movements. The guide rails are spaced from the shaft wall A by means of the guide supporting angles 5 which are usually secured to the closure frame 7 by means of screws 6, or by other suitable means.

In order that the upper and lower sections 1 and 2 may move simultaneously in opening and closing, chains 8 have one end thereof secured in chain fastening members 9 which are secured to each side of the upper section 1 and are located near the lower edge thereof. Each of the chains 8 extend upwardly and over respective sheaves 10 which are secured in a housing 11 and rigidly secured to the respective guide supporting angles 5. The opposite ends of the chains 8 are secured to the upper ends of respective chain rods 12, and with the chain rods being secured through an extending member 13 at the upper portion of the lower door section.

An electric motor 14 is shown in Figures 1 and 2 as being provided for each of the sheaves 10 for motor operation of the door. Gear teeth are provided on each of the sheaves 10 through which the sheaves are driven by means of a pinion formed on or secured to the motor shaft. The motors are electrically controlled through the proper electrical equipment (not shown) located at a remote point.

A flexible strap 15 is secured to the upper section of the door and provides means of closing the door should there be an interruption of current for the electric motors, or in the case of manually operated doors, the strap 15 provides means of closing the door.

From the above, it is obvious that the upper section 1 of the door moves upwardly in its opening movement and downwardly in its closing movement. It is likewise obvious that the lower section 2 moves downwardly in its opening movement and upwardly in its closing movement. When the sections have reached their full open position, the lower edge of the upper section 1 approximates the level of the lintel 16 while the upper surface of the lower section rests substantially flush with the sill 17. Stops (not shown) are secured to the guide supporting angles 5 below the level of the sill 17 and provide means supporting the lower section of the door in its full open position for the purpose of supporting loads being trucked thereacross.

When the sections are in closed condition as shown in Figure 1, a space is provided between the upper and lower sections. In order to effectively cover the space between the sections, and to comply with regulations governing the use of doors in elevator hatchways, we have provided the astragal 18 which extends substantially the full distance between the closure frame jambs and which is hingedly secured to the lower edge of the upper section of the door. The astragal 18 is hingedly secured to the upper section by means of hinges, with the leaf 19 thereof being secured to the edge of the door, and with leaves 20 being secured to the astragal 18. The hinge leaves 19 and 20 are secured together by means of the hinge pins 21 extending therethrough, as shown more clearly in Figures 3, 4, 6, 9, 11, 13, and 18.

In order to limit the space between the upper and lower sections of the door when in fully closed condition, we have provided a channel-shaped housing 22 near each end of the upper section and with the housings 22 being secured through one leg thereof to the lower edge of the section by means of screws 23, or by other suitable means. The lower leg of the housing 22 has an aperture formed therethrough for the reception of the locking pin 24. A pin guide member 25 is secured in the housing with an aperture being formed therein and in concentric relation with the pin aperture formed through the lower leg of the housing. A rubber bumper member 40 is secured to the under side of the housing 22 to absorb shocks occurring when the doors come to the fully closed position. The bumper member also has an aperture formed therethrough for the reception of the pin member.

The locking pin is comprised of the pin housing 24 into which is inserted the compression spring 26 and the sliding pin member 27. The sliding pin member 27 has the slot 28 formed therethrough for the reception of the retaining pin 29. The retaining pin 29 limits the upward movement of the housing 24 when the door is fully closed, and also prevents the sliding pin 27 from disengaging from its housing 24 when the door is open or partially open. Pressure of the sliding pin 27 against the spring 26 forces the housing 24 upwardly from the position shown in Figure 7 to the locking position shown in Figure 5.

A keeper 30 is provided to prevent the astragal 18 from being swung away from its normal position while the door is closed. The keeper 30 is hingedly secured to the astragal 18 with the free end thereof resting on the member 25. A pin-receiving aperture is formed through the keeper member for the reception of the upper portion of the pin housing 24 as shown in Figures 5, 7, 8, and 10. It will be noted that when the astragal is in its normal position, and when the door is closed, as shown in Figure 5, the pin housing 24 projects upwardly through the keeper and prevents the astragal 18 from being swung from its normal position. As soon as the door is started to open, the pin housing 24 drops to the position as shown in Figures 7 and 10 and leaving the keeper disengaged. Should the astragal meet with an obstruction in the closing movement of the door, the astragal will be swung to the approximate position as shown in Figure 10, with the keeper 30 riding across the top face of the pin guide member 25. When the astragal assumes its normal position, the keeper 30 is returned to the position shown in Figures 7 and 8. As the door assumes its closed position the depending pin 27 contacts the upper edge of the lower section 2 and, by means of the spring 26, forces the pin housing 24 upwardly through the apertures formed through the pin guide member 25 and the keeper 30 thereby preventing the astragal from being swung from its normal position while the door is closed.

The astragal, as above described, is suitable in providing means of preventing serious injury to the operator in the manual operation of the door with sufficient space being provided between the two sections to prevent crushing of the operators hand or arm should the same be caught between the sections in the final closing movement of the door. The above-described astragal is easily adapted to present installations in replacing the conventional rigid type astragals and in providing the safety features thereto.

In order to further enhance the safety featues of the hinged astragal we have provided means instantly stopping the closing movement of the door should the astragal be swung from its normal position in the closing movement of the door. To accomplish this result we have provided ratchet teeth 31 in the adjacent edge of one of the guide rails 4, as more clearly shown in Figures 4, 6, and 9. We have further provided the pivoted pawl member 32 secured in the housing 33 and secured to the lower edge of the upper section 1. The pawl is pivotally secured in the housing 33 by means of the shoulder screw 34. The downwardly extending arm of the pawl has the ratchet-engaging end 35 formed thereon. The horizontally extending arm is provided with an adjusting screw 36 and a lock nut 37, with the adjusting screw providing means compensating for variations in the distances between the upper section of the door and the adjacent edge of the guide rail. When the pawl is used, a portion 38 of the astragal is extended and the upper end of the adjusting screw 36 bears against said portion. When the astragal is swung from its normal position the portion 38 bears downwardly on the adjusting screw and thereby pivots the pawl 32 on the shoulder screw 34 and swings the lower end 35 of the pawl into engagement with the ratchet teeth 31, as shown in Figure 9. Engagement of the pawl with the ratchet teeth causes the closing movement of the door to be immediately arrested. In order to disengage the pawl from engagement with the ratchet teeth, it is necessary to raise the upper section slightly to permit the pawl to swing free of the ratchet teeth, after which the door may be brought to the fully closed position. The spring 41 is provided to normally maintain the pawl in its disengaged position unless the pawl is swung toward the ratchet teeth by pressure from the portion 38 of the astragal.

The ratchet teeth 31 are formed in the edge of the guide rail when it is known at the time of manufacture that the safety astragal is to be used in connection with the door. In order to provide a similar arrangement for doors already installed, we provide the separate ratchet member 39 which is adapted to be bolted or otherwise secured through the guide rail, as shown in Figures 11 and 12. The pawl and ratchet are adaptable to either manually operated doors or to motor operated doors.

When motor operation is applied to doors provided with the safety astragal, it is desirable to provide means interrupting the electric current or means of reversing the motors should the astragal strike an obstruction and be swung from its normal position.

In order to provide means of interrupting the electric current, we have provided a cam assembly comprising the vertical bar 42 secured to the guide rail 4 through the bracket members 43 with a lower connecting link 44 and an upper connecting link 45. The upper link 45 has a lug formed thereon for attachment to the adjusting screw 46, with the adjusting screw limiting the downward movement of the cam bar 42. The adjusting screw is freely slidable through an aperture formed in the angle support 47 which is secured to the guide rail.

An electric interlock or reversing switch 48 is connected in series with the motor circuit and is secured on the guide supporting angle 5 with the switch-actuating plunger 49 extending through the guide supporting angle and the guide rail, and with the roller 50 thereof bearing against the cam bar 42. In order to actuate the interlock or reversing switch through the cam bar 42, we have provided a cam operating lever 51 which is pivotally supported in the housing 52 on the shoulder screw 53. A roller 54 is provided at the lower end of the downwardly extending arm of the cam operating lever and is adapted to bear against the cam bar 42 when swung from its normal position. A horizontal arm is formed on the cam operating lever 51 and carries roller 59 which contacts the surface of the lever-operating cam 55. The lever-operating cam 55 is rigidly secured to and carried by the astragal 18, as shown in Figures 13, 14, 15, and 17. The lever-operating cam has a depressed surface 56 against which the roller 59 bears when the parts are in normal position. An incline 57 is formed adjacent the depressed surface which provides means pivoting the cam operating lever from its normal position when the astragal 18 is swung from its normal position. The movement of the astragal 18 from its normal position causes the roller to ride over the incline 57 onto the higher surface 58 and thereby swinging the cam operating lever into pressing contact with the cam bar 42, as shown in Figure 17.

Movement of the cam bar 42 breaks the electrical circuit to the operating motors through the movement of plunger 49 if an interlock is being used. When a reversing switch is used, movement of the cam bar by the cam operating lever causes the plunger 49 to be depressed with the action thereof operating the reversing contacts, and instantly reverses the motors and causing the movement of the door to immediately be reversed.

The action of the astragal and the locking pins is the same when used with either manually operated or motor operated doors.

It is obvious, from the above description, that the hinged astragal may be used with equal advantage as a safety device on either manually operated doors or on motor operated doors. It is also obvious that the astragal is adapted to both old installations and to new installations, with the use of the same materially decreasing the eventualities of casualties in the operation of elevators.

It is to be understood that minor changes may be made in the several parts and in the arrangement thereof, insofar as the changes may fall within the scope of the appended claims.

What we claim is:

1. In combination with a counterbalanced elevator door movable vertically between guides secured to an elevator shaft wall, an astragal hingedly secured to the upper section of the door and with the astragal being free to swing from its normal position when the door is in non-closed condition, an astragal locking pin carried by the upper door section with said locking pin being operable by contact thereof with the lower door section and engaging a keeper member carried by the astragal and locking the astragal in fixed condition when the door is in fully closed condition.

2. In combination with a counterbalanced elevator door mounted between vertical guides secured to an elevator shaft wall, an astragal hingedly secured to the lower edge of the upper section of the door, a locking pin carried by the upper section of the door and engageable with the lower door section when the sections are in closed condition, and with a keeper being hingedly secured to the astragal and engaging the locking pin and preventing hinged movement of the astragal when the door is in closed condition.

3. In combination with a counterbalanced elevator door mounted between vertical guides secured to an elevator shaft wall, an astragal hingedly secured to the lower edge of the upper section of the door, a locking pin carried by the upper section of the door and engageable with the lower section of the door when the door sections are in closed condition, with a keeper being hingedly secured to the astragal and engaging the locking pin and preventing hinged movement of the astragal when the door is in closed condition.

4. In combination with a counterbalanced elevator door mounted between vertical guides secured to an elevator shaft wall, an astragal hingedly secured to the lower edge of the upper door section, a locking pin carried by the upper section of the door and engageable with the lower section of the door when the sections are in closed condition with a keeper member hingedly secured to the astragal and engaging the locking pin and preventing hinged movement of the astragal when the door is in closed condition, and with the locking pin being automatically disengaged upon opening movement of the door and permitting hinged movement of the astragal.

ARTHUR W. CROKER.
PAUL R. DOEG.

REFERENCES CITED

The following references are of record in the file of this patent:

UNITED STATES PATENTS

| Number | Name | Date |
|--------|------|------|
| 476,947 | Lindskog | June 14, 1892 |
| 770,444 | Rhodes | Sept. 20, 1904 |
| 1,145,881 | Doyle | July 13, 1915 |
| 1,152,013 | Doren | Aug. 31, 1915 |
| 1,356,192 | Cresci | Oct. 19, 1920 |
| 1,417,301 | Cresci | May 23, 1922 |
| 1,483,871 | Davis | Feb. 19, 1924 |
| 2,135,131 | Bassett | Nov. 1, 1938 |